United States Patent [19]

Eda et al.

[11] 4,015,228
[45] Mar. 29, 1977

[54] SURGE ABSORBER

[75] Inventors: Kazuo Eda, Neyagawa; Masanobu Tanaka, Hirakata; Harumasa Kajita, Neyagawa; Mikio Ishida, Neyagawa; Michio Matsuoka, Ibaragi, all of Japan

[73] Assignee: Matsushita Electric Industrial Co., Ltd., Osaka, Japan

[22] Filed: June 5, 1975

[21] Appl. No.: 584,211

[30] Foreign Application Priority Data

June 10, 1974 Japan .............................. 49-66406
July 19, 1974 Japan .............................. 49-83457

[52] U.S. Cl. ................................ 337/28; 337/31; 361/123
[51] Int. Cl.² .................. H01H 71/20; H02H 1/04
[58] Field of Search ............... 337/28, 31, 33, 34, 337/404, 405, 414, 415, 4; 317/61.5, 66, 75, 76; 338/21

[56] References Cited

UNITED STATES PATENTS

| | | | |
|---|---|---|---|
| 2,374,560 | 4/1945 | Nelson | 337/31 |
| 2,504,438 | 4/1950 | McFarlin | 337/33 |
| 2,524,101 | 10/1950 | Earle | 337/31 |
| 3,017,539 | 1/1962 | Robinson | 317/66 |
| 3,151,274 | 9/1964 | Snell | 317/75 |
| 3,811,103 | 5/1974 | Matsudka et al. | 338/21 |
| 3,889,222 | 6/1975 | Takano et al. | 317/66 |

*Primary Examiner*—Harold Broome

[57] ABSTRACT

This invention provides a surge absorber for absorbing surges of electric current. The absorber has a metal oxide varistor hermetically sealed in a hollow insulator by a top and a lower electrical terminal and also has a conductive rod extending substantially downwardly and electrically connected to ground and to the lower electrical terminal by solder and also thermally connected to the metal oxide varistor whereby when the varistor is heated by a surge of an electric current therethrough to a temperature to heat the solder above the melting point of the solder, said conductive rod gets separated from the lower electrical terminal to fall downwardly, thereby stopping the electric current through the metal oxide varistor to ground. The lower electrical terminal is preferably so constructed that a hole is produced therein upon the separation of the conductive rod from the lower electrical terminal for equalizing the atmospheric pressure in the hollow and the pressure of the outside atmosphere, thereby preventing the absorber from exploding.

20 Claims, 5 Drawing Figures

SURGE ABSORBER

This invention relates to a surge absorber used, e.g., for suppression of switching surges and lightning surges in a high voltage circuit, and more particularly relates to a surge absorber using a metal oxide varistor (voltage-dependent resistor) as a characteristic element and which is explosion-proof.

Surge absorbers are used widely for suppression of switching surges or lightning surges in a high voltage circuit to protect motors, transformers, semiconductors and other electrical equipment. There are known many kinds of surge absorbers such as a combined capacitor-resistor type absorber, a spark gap type absorber and a silicon carbide (SiC) varistor type absorber.

Metal oxide varistors made of a zinc oxide (ZnO) sintered body with several additives such as bismuth oxide ($Bi_2O_3$), cobalt oxide (CoO), manganese oxide (MnO) and antimony oxide ($Sb_2O_3$) have recently been developed. They have many good features which would make them usable as a characteristic element of a surge absorber, such as a higher nonlinear exponent, a quick response to a surge voltage and a large capability for absorbing surge energy.

The voltage (V)-current (I) characteristics of a varistor (voltage-dependent resistor) are expressed approximately by the following equation:

$$I = (V/C)^\alpha$$

where $I$ is the current flowing through the varistor, $V$ is the voltage across the varistor, $C$ is a constant corresponding to the resistance of the varistor, and $\alpha$ is a voltage nonlinear (voltage dependence) exponent. The $\alpha$-value of a SiC varistor is about 3 to 7. On the other hand, the $\alpha$-value of a metal oxide varistor can be from about 30 to 70. Therefore, a series spark gap is unnecessary for the metal oxide varistor in actual application, whereas a series spark gap is indispensable for a SiC varistor in order to prevent large leakage current caused by normal applied line voltage. As a result, a metal oxide varistor is very desirable from the view point of surge response in comparison with a spark-gap type surge absorber which has a time-lag for a surge voltage with a steep wave-front. However, in addition to the merit of quick response to a surge voltage, there may be a possibility with a metal oxide varistor of thermal run-away, because the circuit voltage is always applied across the metal oxide varistor. Once the metal oxide varistor begins thermal run-away, the increasing current has a tendency to concentrate gradually at a weak part of the varistor body. The concentrated current melts the weak part and punctures a hole in the varistor body. As a result, an arc is generated along the side surface of the hole and produces a large volume of gas. When applied to a high voltage circuit, a metal oxide varistor is usually hermetically sealed in an insulator to protect the varistor body from dust and humidity. Therefore, with an increase of the internal gas pressure caused by the arc, the insulator is likely to explode, and men and apparatus near the surge absorber are subjected to casualities thereby.

Accordingly, an object of this invention is to provide a surge absorber in which an electric current through a varistor body to ground can be cut off when an excessively large current flows through the varistor.

Another object of this invention is to provide a surge absorber suitable, e.g., for high voltage use which is explosion-proof, i.e., which prevents the explosion of the insulator of the absorber by releasing the high pressure of gas caused by the arc through a pressure-releasing hole made by Joule heat due to thermal run-away of the metal oxide varistor.

These objects are achieved by the provision of a surge absorber according to this invention which comprises a hollow insulator having a top and a lower opening at a top and a lower portion thereof, respectively; a top and a lower electrical terminal provided at said top and lower portions, respectively, and hermetically sealing said top and lower openings, respectively; a metal oxide varistor positioned in said hollow and provided with a top and a bottom electrode at a top and a bottom surface thereof, respectively, which are electrically connected to said top and lower electrical terminals, respectively, said metal oxide varistor being supported by said top and lower portions of said insulator through said top and lower electrical terminals, respectively; and a conductive rod electrically connected to ground, the bottom end of which is a free end and the top end of which is soldered to said lower electrical terminal by solder which is thermally connected to said metal oxide varistor through said bottom electrode of said metal oxide varistor and said lower electrical terminal, whereby when said metal oxide varistor is heated by an electric current therethrough to a temperature to heat said solder above the melting point of said solder, said conductive rod is separated from said lower electrical terminal so as to fall downwardly, thereby stopping the electric current flowing through said metal oxide varistor to ground.

There can be provided a compression spring supported by said top electrical terminal and contacted by said metal oxide varistor for urging said metal oxide varistor downwardly so as to cause said metal oxide varistor to be securely supported in said hollow insulator. Said lower electrical terminal can comprise a conductive cover plate extending to and supported by the side and outer surface of said lower portion of said insulator for covering said lower opening of said insulator, said conductive cover plate supporting said metal oxide varistor and having said conductive rod soldered to the outside surface thereof so that said conductive rod can fall downwardly due to gravity when said solder becomes molten. Said top electrical terminal can comprise a conductive cover cap extending to and supported by the side and outer surface of said top portion of said insulator for covering said top opening of said insulator, said conductive cover cap supporting said top surface of said metal oxide varistor.

Said lower opening of said insulator can be substantially coaxial with and smaller in cross-section than said hollow so as to define a ring-shaped supporting surface of said insulator for supporting a lower conductive cover plate which serves as said lower electrical terminal and is inserted in said hollow between said bottom electrode of said metal oxide varistor and said ring-shaped supporting surface of said insulator for covering said lower opening of said insulator. In this case, said lower conductive cover plate can have a hole substantially at the center thereof which is covered by said top end of said conductive rod and said solder, whereby after said conductive rod is separated from said lower conductive cover plate due to the melting in said solder, said hole of said lower conductive cover plate functions to equalize the atmospheric pressure in said hollow and the pressure of the outside atmosphere. Said lower conductive cover plate can also have a thin part, without a hole, substantially at a center thereof to which said conductive rod is soldered, the thickness of said thin part of said lower conductive cover plate being such that when said conductive rod is separated from said lower conductive cover plate due to the melting of said solder, said thin part also becomes molten due to the arc generated between said conductive rod and said thin part of said lower conductive cover plate to make a hole in said lower conductive cover plate which hole functions to equalize the atmospheric pressure in said hollow and the pressure of the outside atmosphere.

Said insulator can additionally comprise an additional hollow below said lower portion of said insulator, which additional hollow is substantially coaxial with and larger in cross section than said lower opening of said insulator, said insulator having a bottom conductive cover cap mounted at a bottom portion of said additional hollow thereof and electrically connected to said conductive rod, said bottom conductive cover cap having a hole through which said conductive rod can fall when said conductive rod is separated from said lower conductive cover plate. In this case, said bottom conductive cover plate can have an additional hole for promoting said pressure equalization. Further, there can be provided a compression spring positioned in said additional hollow for urging said conductive rod downwardly with a force to cause said lower conductive cover plate to keep its initial form until said solder becomes molten, i.e., with a force not too strong to damage said lower conductive cover plate in the ordinary state, so as to make easier the separation of said conductive rod from said lower conductive cover plate.

This invention will be more fully understood from the following detailed description, taken together with the accompanying drawings, in which.

Details of this invention will be described in connection with the following embodiments, but these embodiments should not be construed to limit the scope of this invention.

EXAMPLE 1

Figure 1:
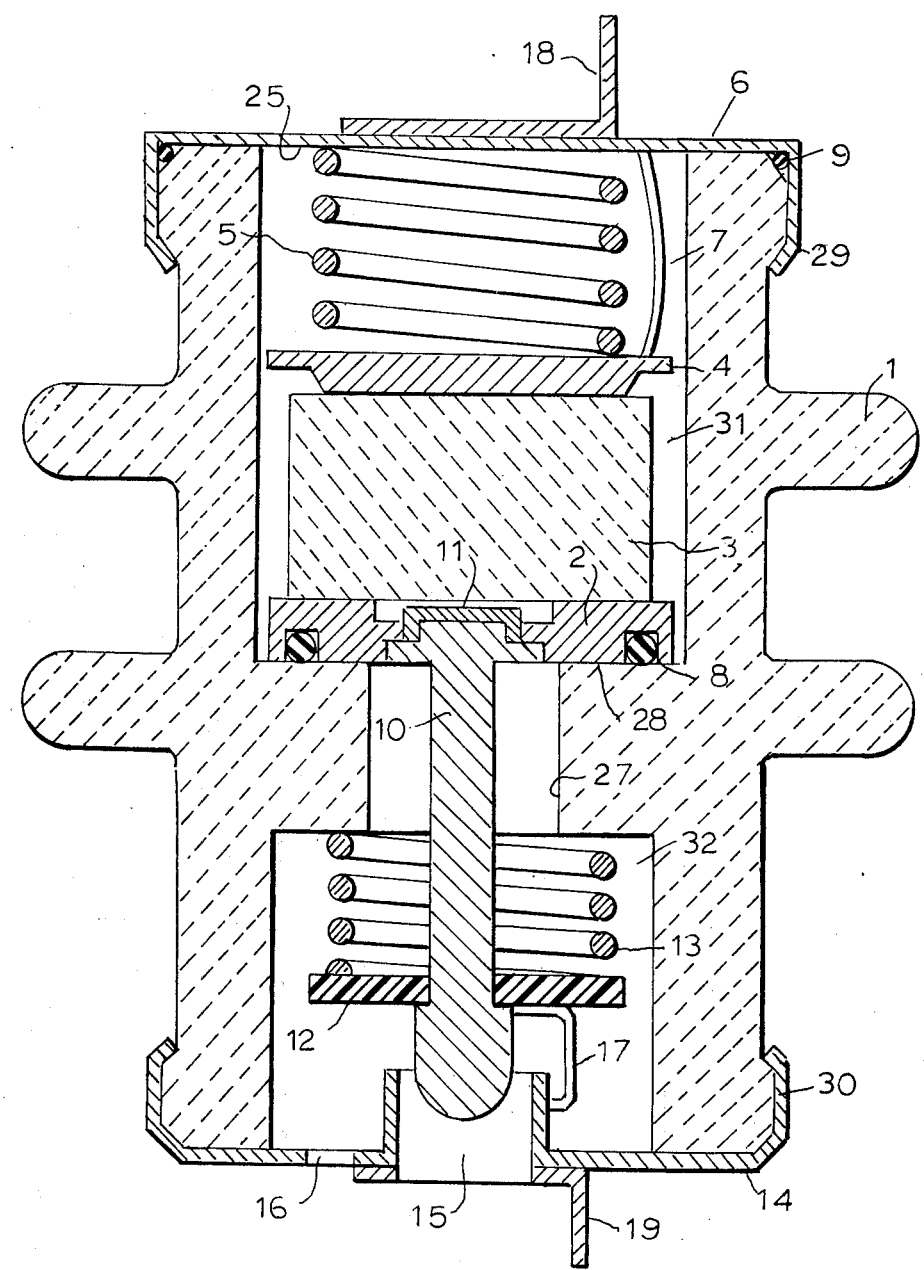
FIG. 1 is a cross-sectional view of one example of a surge absorber of this invention.

FIG. 1 shows one example of a surge absorber of this invention, in which reference numeral 1 designates a hollow insulator made, e.g., of a ceramic having a top opening 25 and a lower opening 26 at a top and a lower portion thereof, respectively, as shown. FIG. 1 shows the case when the hollow is cylindrical. It is not necessary that the form of the hollow always be cylindrical. The whole length of the insulator in FIG. 1 is for example 10 cm. The outer diameter is, e.g., 45 mm and the inner diameter, i.e., diameter of the hollow, is, e.g., 25 mm. The central part 27 of the cylindrical hollow 31 is substantially coaxial with and smaller in cross-section, cut by a plane perpendicular to the axis of the cylindrical hollow, than the hollow 31 and the additional hollow 32 described later so as to define a ring-shaped supporting surface 28. Reference numeral 2 designates a lower conductive cover plate serving as a lower electrical terminal and supported by the ring-shaped supporting surface 28 of the insulator 1, which plate 2 is connected electrically and thermally to a bottom electrode (not shown) on the bottom surface of a metal oxide varistor 3. The lower conductive cover plate 2 has a hole substantially in the center which hole acts as a pressure releasing hole after a rod 10 has fallen down. The word "substantially" indicates that the position need not necessarily be exactly at the center of the lower conductive cover plate. It is preferable that a part of the conductive cover plate 2 near the hole be thinner than the other part, as shown. The lower conductive cover plate 2 is made, e.g., of copper and has a thickness, e.g., of 5 mm. Said hole in the plate 2 has a diameter, e.g., of 5 mm. The thickness of the plate 2 near the hole is, e.g., 3 mm. The metal oxide varistor 3 has a top electrode (not shown) and a bottom electrode on a top surface and a bottom surface thereof. The varistor body of the varistor 3 is, e.g., a sintered body composed, e.g., of 96 mole % of ZnO, 0.5 mole % of $Bi_2O_3$, 0.5 mole % of MnO, 0.5 mole % of CoO, 1.0 mole % of $Sb_2O_3$, 0.25 mole % of $SiO_2$, 1.0 mole % of NiO and 0.25 mole % of $Cr_2O_3$. The varistor 3 has a diameter, e.g., of 20 mm and a thickness, e.g., of 20 mm. An upper conductive plate 5 is connected to the top electrode of the metal oxide varistor 3. A compression spring 5 made, e.g., of stainless steel is supported by the top conductive cover cap 6 and the upper conductive plate 4 for urging the metal oxide varistor 3 downwardly. Said top conductive cover cap 6 serves as a top electrical terminal and extends to and supported by the side and is outer surface 29 of the top portion of said insulator 1 for covering said top opening 25 of said insulator 1. The top conductive cover cap 6 is made, e.g., of chromium coated copper. A conductive wire 7 made, e.g., of copper electrically connects the top conductive cover cap 6 to the upper conductive plate 4 electrically. O-rings 8 and 9 made, e.g., of rubber hermetically seal said metal oxide varistor 3 in said insulator 1 as shown. A conductive rod 10 made, e.g., of copper and having a diameter, e.g., of 5 mm at its fatter part and 3 mm in its slender part acts also as a trouble indicator as explained later. The conductive rod 10 is inserted into said hole of said lower conductive cover plate 2. Solder 11, e.g., of a Pb-Sn alloy having a melting point of 120° C bonds said conductive rod 10 to said lower conductive cover plate 2 as shown. Said hole of said lower conductive cover plate 2 is thus filled by said conductive rod 10 and said solder 11. Said metal oxide varistor 3 is sealed in the insulator 1 by said top conductive cover cap 6, said lower conductive cover plate 2, said O-rings 8 and 9, said conductive rod 10, and said solder 11. The object of the sealing is to prevent the deterioration of the metal oxide varistor 3, e.g., from dust and humidity in the air. A supporting plate 12 e.g., of bakelite supports a compression spring 13 which urges said conductive rod 10 downwardly with a force sufficient to cause said lower conductive cover plate 2 to keep its initial form until said solder becomes molten, i.e., with a force not too strong to damage, at its strongest, the form of said lower conductive plate 2 in an ordinary state. A bottom conductive cover cap 14 made, e.g., of chromium coated copper is mounted on the side and outer surface 30 of the bottom portion of said insulator 1 for covering the bottom opening of said insulator 1. An additional hollow 32 is provided which is substantially coaxial with and greater in cross section than said lower opening 27. A hole 15, e.g., of a diameter of 7 mm is located substantially at the center of said bottom conductive cover cap 14. An additional hole 16, e.g, of a diameter of 5 mm, is provided in cover cap 14 for promoting pressure equalization as explained later. A conductive wire 17 made, e.g., of copper electrically connects said conductive rod 10 to said bottom conductive cover cap 14. It be preferred that the conductive wire is made of a relatively soft material so that conductive rod 10 can easily fall. A top electrical lead 18 is attached to said top conductive cover cap for applying power to the varistor 3, and a bottom lead 19 is attached to said bottom conductive cover cap 14 for grounding said bottom conductive cover plate.

Figure 2:
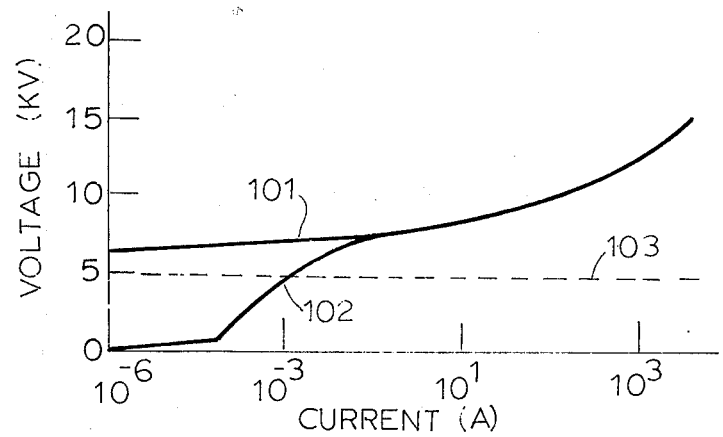
FIG. 2 is a graph showing typical V-I characteristics of a metal oxide varistor used for the present invention.

The action of the surge absorber of FIG. 1 is as follows: (explanation will be of 3 KV AC lines.) FIG. 2 shows typical voltage (V)-current (I) characteristics of a metal oxide varistor 3. Curve 101 in FIG. 2 is the normal V-I curve. The maximum peak voltage of 3KV AC is about 4.9 KV (3×1.15× √2≈4.9) shown by dotted line 103 in FIG. 2. As can be easily understood from FIG. 2, the maximum leakage current flowing through the metal oxide varistor is usually less than 1 μA at normal state. In that case, because the power applied to the metal oxide varistor is less than 5 mW, Joule heat generated therein can be neglected in the light of the heat capacity of the metal oxide varistor (the volume of a typical metal oxide varistor used in 3KV AC line is about 6cm$^3$) and heat is released through a conductive plate and a conductive wire. However, as the metal oxide varistor deteriorates, the current flowing through the metal oxide varistor increases, and it may become as shown by the curve 102 in FIG. 2. For example, in the case where a leakage current of 40 or 50 mA flows through a varistor having a diameter of 32 mm and a thickness of 20 mm, the surface temperature of the varistor exceeds 200° C. Curve 102 is a typical V-I curve after deterioration. As a result of an increase of current, Joule heat generated in the metal oxide varistor cannot be neglected and the temperature of the metal oxide varistor rises. As the temperature coefficient of resistance is negative, the increase of the temperature of the metal oxide varistor causes a further increase of the current, and finally the so-called thermal run-away process occurs. As a result of the thermal run-away, a certain small part of the metal oxide varistor melts and causes a puncture. And then, the internal gas pressure within the insulator begins to increase due to the arc generated along the surface of the molten part of the metal oxide varistor due to puncture.

However, the transfer of Joule heat to said solder 11 occurs prior to the increase of the gas pressure, and said solder 11 becomes molten to permit said conductive rod 10 to separate from said lower conductive cover plate 2, and this separation of the conductive rod is promoted by the action of said spring 13. Thereby, the conductive rod 10 falls downwardly. The word "downwardly" does not necessarily indicate the direction of the gravity of the conductive rod 10. It also indicates the direction of the length or axis of the hollow insulator 1 or the direction of the force of the spring 13. Thus, any solder which has such a function can be used therefor. For example, a low melting point alloy or other solders can be used therefor. Accordingly, a gas pressure releasing hole is made through said lower conductive cover plate 2 which has been sealing the hollow 31 of insulator, so that the gas generated by the arc can be exhausted through the thus made hole of the lower conductive cover plate 2, the additional hollow 32 and the hole 16 of said lower conductive cover cap 14. The hole 15 acts also to exhaust high pressure gas. At the same time, said conductive rod 10 can protrude through the hole 15 to act as a visible trouble indicator. By this action, the explosion of the insulator is prevented and thus caused trouble can be indicated by the conductive rod 10 protruding through said hole 15.

When said conductive rod 10 is separated from said lower conductive cover plate 2, if the circuit is cut off electrically, the arc stops and no explosion occurs. However, in a high voltage and high power circuit, it is very difficult to cut off the circuit electrically without providing a large cut off gap. However, in this invention, an explosion can be prevented by providing a pressure releasing hole using Joule heat generated in the metal oxide varistor by thermal run-away, even if the electric current is not cut off in the case when the conductive rod 10 cannot get sufficiently far away from the lower conductive cover plate to cut off the arc therebetween after said separation. It is self evident that a tension spring can be used instead of the compression spring.

Figure 3:
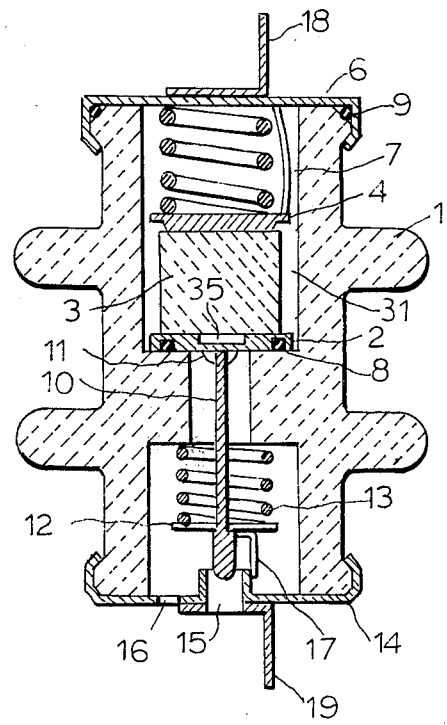
FIG. 3 is a cross-sectional view of another example of a surge absorber of this invention.

FIG. 3 shows the structure of another embodiment of a surge absorber according to this invention. The structure of FIG. 3 is basically the same as that of the embodiment of FIG. 1 and the same reference numerals are used for the corresponding elements. The difference between FIG. 1 and FIG. 3 is in the structure of the lower conductive cover plate 2 and the action of forming a gas pressure releasing hole. The conductive cover plate 2 having a thickness, e.g., 5 mm has a thin part 35, e.g., 0.5 mm thick in an area, e.g., of 5 mm substantially at a center thereof to which the conductive rod 10 is soldered, the thickness of said thin part 35 of said lower conductive cover plate 2 being such that when said conductive rod 10 is separated from said conductive cover plate 2 due to the melting of said solder, said thin part also becomes molten due to the arc generated between said conductive rod 10 and said thin part of said lower conductive cover plate 2 to form a hole in said thin part of said lower conductive cover plate 2. The thus formed hole functions to exhaust the high pressure gas in the hollow 31, i.e., to permit equalization of the atmospheric pressure in said hollow 31 of the insulator and the pressure of the outside atmosphere.

The object of the structure of the embodiment of FIG. 3 is to make a gas pressure releasing hole by an arc generated between the thin part of the conductive cover plate 2 and conductive rod 10 when the conductive rod 10 is separated from the conductive cover plate 2 by Joule heat of the metal oxide varistor. The conductive rod 10 and the thin part of the conductive cover plate 2 should be so arranged that the distance between the thin part of the conductive cover plate 2 and the top of the conductive rod 10 is shorter than the distance between other parts of the conductive cover plate 2 and the top of the conductive rod 10 after separation for the purpose of maintaining an arc between the conductive rod and a substantially fixed position on the thin part of the conductive cover plate 2.

Figure 4:
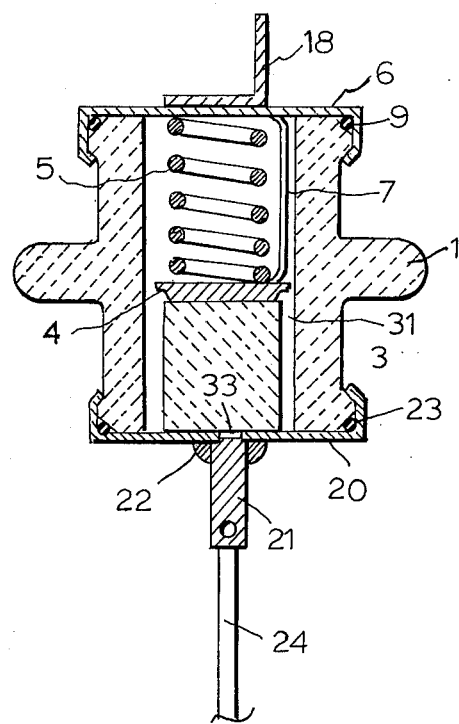
FIG. 4 is a cross-sectional view of still another example of a surge absorber of this invention.

FIG. 4 shows the structure of still another embodiment of a surge absorber of this invention. The structure of FIG. 4 is basically the same as that of the upper half of the surge absorber of FIG. 1, and the same reference numerals are used for the corresponding elements. The difference between FIG. 1 and FIG. 4 is in the structure and the mechanism causing separation between the lower conductive plate and the conductive rod. In FIG. 4, the action of gravity in the conductive rod is used to separate the conductive rod from the lower conductive cover plate without using the spring mechanism described in Example 1.

In FIG. 4, reference numeral 20 designates the lower conductive cover plate which extends to and is mounted on the outer and side surface of the insulator as shown and which supports the metal oxide varistor 3. The lower conductive cover plate 20 has a hole 33 substantially at the center and is connected to the bottom electrode on the bottom of the metal oxide varistor 3 electrically and thermally. The conductive rod 21 is partially inserted in the hole 33 of the lower conductive plate 20 and is soldered by a solder 22 as shown. The solder fixes the conductive rod 21 to the plate 20 and seals the metal oxide varistor in the hollow 31 of the insulation 1. An O-ring 23 hermetically seals the plate 20 and insulator 1. The metal oxide varistor 3 is sealed within the insulator 1 by the top conductive cover cap 6, the lower conductive cover plate 20, the conductive rod 21, the solder 22 and O-rings 9 and 23. A lower conductive wire 24 is connected to ground.

The action of melting of the solder 22 is the same as that in the embodiment of FIG. 1. A gas pressure releasing hole is made through the conductive cover plate 20 due to the melting of the solder 22 and the falling of the conductive rod 21 downwardly due to the action of gravity on the conductive rod 21. The hole can permit equalization of the atmospheric pressure in the hollow 31 of the insulator 1 and the pressure of the outside atmosphere. The trouble in the surge absorber which has thus occurred is indicated by the falling (namely absence) of the conductive rod 21 or the lower conductive wire 24.

The object of the structure of FIG. 4 is to prevent the explosion of the insulator by forming a gas pressure releasing hole by using the falling of the conductive rod 21 due to gravity, and to indicate the trouble in the surge absorber by the falling of the conductive rod 21 or the conductive wire 24.

Figure 5:
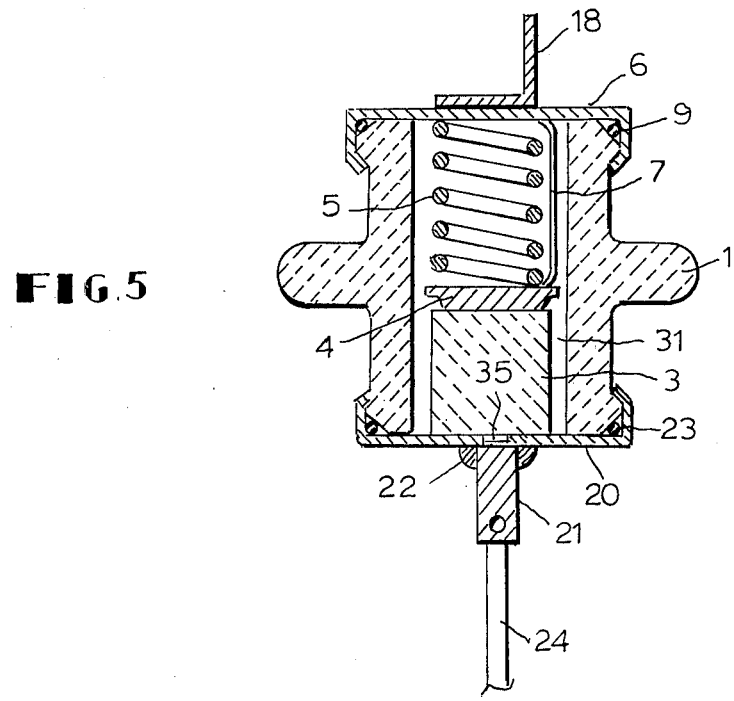
FIG. 5 is a cross-sectional view of yet another example of a surge absorber of this invention.

FIG. 5 shows the structure of yet another embodiment of a surge absorber of this invention. The structure of FIG. 5 is basically the same as that of FIG. 4, and same reference numerals are used for the corresponding elements. The difference between FIGS. 4 and 5 is in the structure of the lower conductive cover plate and the means for forming a gas pressure releasing hole to permit equalization of the atmospheric pressure in the hollow of the insulator and the pressure of the outside atmosphere.

In FIG. 5, reference numeral 20 is a lower conductive cover plate which has a thin part 35 substantially at the center thereof to which the conductive rod 21 is soldered by the solder 22 as shown. The thickness of the thin part 35 of the lower conductive cover plate 20 is such that when the conductive rod 21 is separated from the lower conductive cover plate 20 due to the melting of the solder, the thin part also becomes molten due to the arc generated between the conductive rod 21 and the thin part 35 of the lower conductive cover plate 20 to form a gas pressure releasing hole in the thin part 35. The lower conductive wire 24 and the conductive rod 21 are so arranged that the arc can be generated between the thin part 35 and the conductive rod 21.

The action of melting of the solder 22 is the same as that in FIG. 4. A gas pressure releasing hole is formed by the arc generated between the conductive rod 21 and the thin part 35 of the lower conductive cover plate 20 by the same mechanism as that in FIG. 3 after the separation between the conductive rod 21 and the lower conductive cover takes place due to the falling of the conductive rod 21 due to gravity from the conductive cover plate 20. The hole can permit equalization of the atmospheric pressure in the hollow 31 of the insulator 1 and the pressure of the outside atmosphere. The trouble in the surge absorber which has thus occurred is indicated by the falling of the lower conductive wire 24 or conductive rod 21.

The object of the structure of FIG. 5 is to prevent explosion of the insulator by making a gas pressure releasing hole by using an arc between the conductive rod 21 and the lower conductive cover plate 20 and the falling of the conductive rod 21 due to gravity and to indicate the trouble in the surge absorber by the falling of the conductive wire 24 or conductive rod 21.

What is claimed is:

1. A surge absorber comprising:
   a hollow insulator having a top and a lower opening at a top and a lower portion thereof, respectively;
   a top electrical terminal at said top portion and hermetically sealing said top opening;
   a metal oxide varistor positioned in said hollow insulator and having a top and a bottom electrode at the top and bottom surfaces thereof, respectively, the top electrode being electrically connected to said top electrical terminal; and
   a sealing means sealing the lower opening of said hollow insulator and comprised of a lower electrical terminal and a conductive rod electrically connected to ground, the bottom end of which is a free end and the top end of which is soldered to said lower electrical terminal by a solder, said metal oxide varistor being supported by said top and lower portions of said insulator through said top and lower electrical terminals, respectively, and said conductive rod being thermally connected to said metal oxide varistor through said bottom electrode of said metal oxide varistor and said lower electrical terminal, whereby when said metal oxide varistor is heated by an electric current therethrough to a temperature to heat said solder above the melting point of said solder, said conductive rod is separated from said lower electrical terminal to fall downwardly, thereby stopping the electrical current through said metal oxide varistor to ground.

2. A surge absorber according to claim 1 further comprising a compression spring supported by said top electrical terminal and contacted by said metal oxide varistor for urging said metal oxide varistor downwardy.

3. A surge absorber according to claim 1 wherein said lower electrical terminal comprises a conductive cover plate extending to and supported by the side and outer surface of said lower portion of said insulator for covering said lower opening of said insulator, said conductive cover plate supporting said metal oxide varistor and having said conductive rod soldered into the aperture thereof so that said conductive rod can fall downwardly due to gravity when said solder becomes molten.

4. A surge absorber according to claim 3 wherein said lower conductive cover plate has a hole substantially at the center thereof which is filled by said top end of said conductive rod and said solder, whereby after said conductive rod is separated from said lower conductive cover plate due to the melting of said solder, said hole of said lower conductive cover plate functions to permit equalization of the atmospheric pressure in said hollow and the pressure of the outside atmosphere.

5. A surge absorber according to claim 1 wherein said top electrical terminal comprises a conductive cover cap extending to and supported by the side and outer surface of said top portion of said insulator for covering said top opening of said insulator, said conductive cover cap supporting said top surface of said metal oxide varistor.

6. A surge absorber according to claim 1 wherein said lower opening of said insulator is substantially coaxial with and smaller in cross-section than the hollow interior of said insulator so as to define a ring-shaped supporting surface on said insulator, and said lower electrical terminal is a lower conductive cover plate positioned in said hollow interior between said bottom electrode of said metal oxide varistor and said ring-shaped supporting surface of said insulator.

7. A surge absorber according to claim 6 wherein said lower conductive cover plate has a hole substantially at the center thereof which is filled by said top end of said conductive rod and said solder, whereby after said conductive rod is separated from said lower conductive cover plate due to the melting of said solder, said hole of said lower conductive cover plate functions to permit equalization of the atmospheric pressure in said hollow and the pressure of the outside atmosphere.

8. A surge absorber according to claim 6, wherein said insulator additionally has an additional hollow below said lower portion of said insulator, which additional hollow is substantially coaxial with and larger in cross-section than said lower opening of said insulator, said insulator having a bottom conductive cover cap mounted at the bottom portion of said additional hollow thereof and electrically connected to said conductive rod, said bottom conductive cover cap having a hole through which said conductive rod can fall when said conductive rod is separated from said lower conductive cover plate.

9. A surge absorber according to claim 8 wherein said bottom conductive cover cap has an additional hole for promoting said pressure equalization.

10. A surge absorber according to claim 8 which additionally comprises a compression spring positioned in said additional hollow and engaged with said conductive rod for urging said conductive rod downwardly with a force to cause said lower conductive cover plate to retain its initial form until said solder gets molten.

11. A surge absorber comprising:
a hollow insulator having a top and a lower opening at a top and a lower portion thereof, respectively;
a top electrical terminal at said top portion and hermetically sealing said top opening;
a metal oxide varistor positioned in said hollow insulator and having a top and a bottom electrode at the top and bottom surfaces thereof, respectively, the top electrode being electrically connected to said top electrical terminal; and
a lower electrical terminal sealing the lower opening of said hollow insulator, said metal oxide varistor being supported by said top and lower portions of said insulator through said top and lower electrical terminals, respectively, and a conductive rod electrically connected to ground, the bottom end of which is a free end and the top end of which is soldered to said lower electrical terminal by a solder, and said conductive rod being thermally connected to said metal oxide varistor through said bottom electrode of said metal oxide varistor and said lower electrical terminal, whereby when said metal oxide varistor is heated by an electric current therethrough to a temperature to heat said solder above the melting point of said solder, said conductive rod is separated from said lower electrical terminal to fall downwardly, thereby stopping the electrical current through said metal oxide varistor to ground.

12. A surge absorber according to claim 11 further comprising a compression spring supported by said top electrical terminal and contacted by said metal oxide varistor for urging said metal oxide varistor downwardly.

13. A surge absorber according to claim 11 wherein said lower electrical terminal comprises a conductive cover plate extending to and supported by the side and outer surface of said lower portion of said insulator for covering said lower opening of said insulator, said conductive cover plate supporting said metal oxide varistor and having said conductive rod soldered into the aperture thereof so that said conductive rod can fall downwardly due to gravity when said solder becomes molten.

14. A surge absorber according to claim 11, wherein said lower conductive cover plate has a thin part substantially at the center thereof to which said conductive rod is soldered, the thickness of said thin part of said lower conductive rod being such that when said conductive rod is separated from said lower conductive cover plate due to the melting of said solder, said thin part also becomes molten due to the arcs generated between said conductive rod and said thin part of said lower conductive cover plate to form a hole in said lower conductive cover plate, which hole functions to permit equalization of the atmospheric pressure in said hollow and the pressure of the outside atmosphere.

15. A surge absorber according to claim 11, wherein said top electrical terminal comprises a conductive cover cap extending to and supported by the side and outer surface of said top portion of said insulator for covering said top opening of said insulator, said conductive cover cap supporting said top surface of said metal oxide varistor.

16. A surge absorber according to claim 11 wherein said lower opening of said insulator is substantially coaxial with and smaller in cross-section than the hollow interior of said insulator so as to define a ring-shaped supporting surface on said insulator, and said lower electrical terminal is a lower conductive cover plate positioned in said hollow interior between said bottom electrode of said metal oxide varistor and said ring-shaped supporting surface of said insulator. for covering said lower opening of said insulator.

17. A surge absorber according to claim 16 wherein said lower conductive cover plate has a thin part substantially at a center thereof to which said conductive rod is soldered, the thickness of said thin part of said lower conductive cover plate being such that when said conductive rod is separated from said lower conductive cover plate due to the melting of said solder, said thin part also becomes molten due to the arc generated between said conductive rod and said thin part of said lower conductive cover plate to form a hole in said lower conductive cover plate, which hole functions to permit equalization of the atmospheric pressure in said hollow and the pressure of the outside atmosphere.

18. A surge absorber according to claim 16 wherein said insulator additionally has an additional hollow below said lower portion of said insulator, which additional hollow is substantially coaxial with and larger in cross-section than said lower opening of said insulator, said insulator having a bottom conductive cover cap mounted at the bottom portion of said additional hollow thereof and electrically connected to said conductive rod, said bottom conductive cover cap having a hole through which said conductive rod can fall when said conductive rod is separated from said lower conductive cover plate.

19. A surge absorber according to claim 16 wherein said bottom conductive cover cap has an additional hole for promoting said pressure equalization.

20. A surge absorber according to claim 16 which additionally comprises a compression spring positioned in said additional hollow and engaged with said conductive rod for urging said conductive rod downwardly with a force to cause said lower conductive cover plate to retain its initial form until said solder gets molten.

* * * * *